United States Patent
Tsuchiya et al.

(10) Patent No.: US 12,507,884 B2
(45) Date of Patent: Dec. 30, 2025

(54) OPHTHALMIC APPARATUS

(71) Applicant: NIDEK CO., LTD., Gamagori (JP)

(72) Inventors: Megumi Tsuchiya, Gamagori (JP);
Kenji Nakamura, Gamagori (JP)

(73) Assignee: NIDEK CO., LTD., Gamagori (JP)

( * ) Notice: Subject to any disclaimer, the term of this patent is extended or adjusted under 35 U.S.C. 154(b) by 790 days.

(21) Appl. No.: 17/866,849

(22) Filed: Jul. 18, 2022

(65) Prior Publication Data
US 2023/0036046 A1 Feb. 2, 2023

(30) Foreign Application Priority Data

Jul. 27, 2021 (JP) .................... 2021-122755

(51) Int. Cl.
*A61B 3/00* (2006.01)
*A61B 3/10* (2006.01)
*A61B 3/12* (2006.01)

(52) U.S. Cl.
CPC .......... *A61B 3/0083* (2013.01); *A61B 3/0008* (2013.01); *A61B 3/1005* (2013.01); *A61B 3/102* (2013.01); *A61B 3/12* (2013.01)

(58) Field of Classification Search
CPC .......... A61B 3/12; A61B 3/145; A61B 3/152; A61B 3/0091; A61B 3/15; A61B 3/0075; A61B 3/14; A61B 3/0008; A61B 3/0083; A61B 3/1005; A61B 3/102; A61B 3/117
See application file for complete search history.

(56) References Cited

U.S. PATENT DOCUMENTS 5,909,268 A * 6/1999 Isogai .................... A61B 3/152
351/208

FOREIGN PATENT DOCUMENTS

| EP | 3 001 943 A1 | 4/2016 |
|----|----|----|
| JP | H10-127581 A | 5/1998 |
| JP | 2016-067795 A | 5/2016 |
| JP | 2019-134896 A | 8/2019 |

* cited by examiner

*Primary Examiner* — Brandi N Thomas
(74) *Attorney, Agent, or Firm* — Oliff PLC

(57) ABSTRACT

An ophthalmic apparatus includes a tester having a target projecting optical system and a target photographing optical system. with a configuration on an examinee's eye side being non-telecentric, an alignment adjuster that adjusts at least a positional relationship between an examinee's eye and the tester in the direction of a working distance between the examinee's eye and the tester, and a corrector that acquires an actual error from a proper working distance based on association information indicating the association of position information on the positions of first and second target images on an observation image with an error in the working distance with respect to the proper working distance due to the corneal curvature radius of the examinee's eye and the non-telecentricity of the target photographing optical system and the position information on the tester at the current position thereof in the working distance direction, correcting the actual error.

5 Claims, 5 Drawing Sheets

OPHTHALMIC APPARATUS

CROSS-REFERENCE TO RELATED APPLICATION

This application claims priority from Japanese Patent Application No. 2021-122755 filed with the Japan Patent Office on Jul. 27, 2021, the entire content of which is hereby incorporated by reference.

BACKGROUND

1. Technical Field

The present disclosure relates to an ophthalmic apparatus.

2. Related Art

An ophthalmic apparatus has been known, which performs alignment between an examinee's eye and an eye tester in a working distance direction by means of alignment targets projected on a cornea under different projection conditions. For example, a device of JP-A-10-127581 performs alignment in a working distance direction by using an infinite target and a finite target as alignment targets.

SUMMARY

An ophthalmic apparatus includes: a target projecting optical system that projects a first target and a second target on a cornea of an examinee's eye under different projection conditions; a target photographing optical system that is configured such that a configuration on an examinee's eye side is non-telecentric and photographs an observation image including a first target image as an image of the first target reflected by the cornea and a second target image as an image of the second target reflected by the cornea; a tester including the target projecting optical system and the target photographing optical system; an alignment adjuster that adjusts at least a positional relationship between the examinee's eye and the tester in a direction of a working distance which is a distance between the examinee's eye and the tester; and a corrector that acquires an actual error from a proper working distance on the basis of association information indicating an association of position information on positions of the first and second target images on the observation image with an error in the working distance with respect to the proper working distance due to a corneal curvature radius of the examinee's eye and a non-telecentricity of the target photographing optical system and the position information on the tester at a current position thereof in the working distance direction, thereby correcting the actual error.

DETAILED DESCRIPTION

Figure 1:
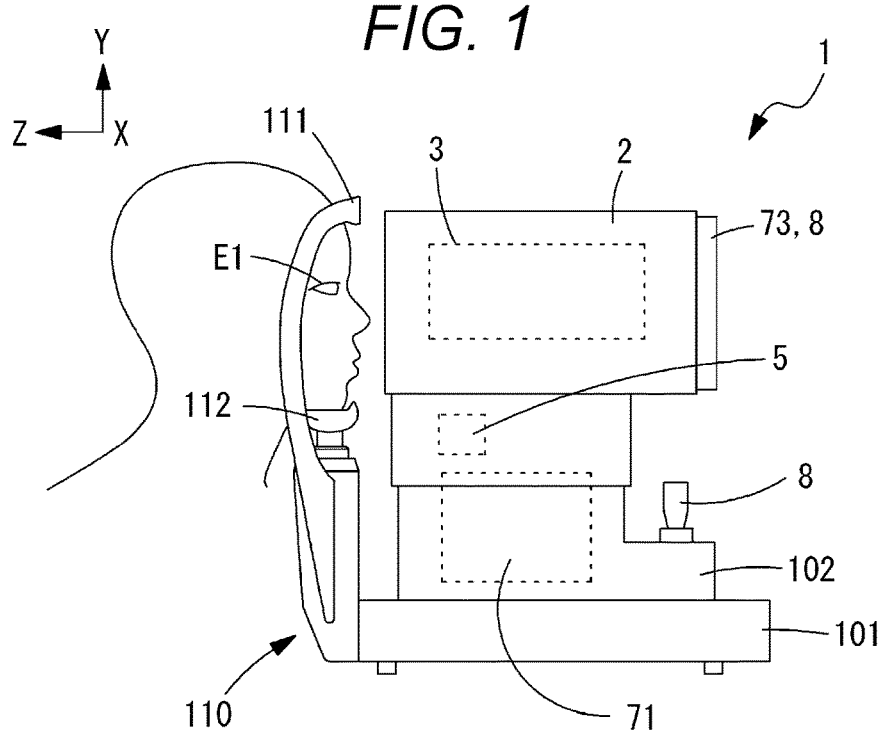
FIG. 1 is an external view of an ophthalmic apparatus.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the device described in JP-A-10-127581, alignment in the working distance direction is performed using a target photographing optical system in which a configuration on an examinee's eye side is telecentric. On the other hand, JP-A-10-127581 fails to discuss alignment in the working distance direction by means of a target photographing optical system in which a configuration on an examinee's eye side is non-telecentric.

One object of the present disclosure is to provide an ophthalmic apparatus including a target photographing optical system in which a configuration on an examinee's eye side is non-telecentric and configured so that a test result can be accurately obtained.

An ophthalmic apparatus according to an aspect of the present disclosure includes: a target projecting optical system that projects a first target and a second target on a cornea of an examinee's eye under different projection conditions; a target photographing optical system that is configured such that a configuration on an examinee's eye side is non-telecentric and photographs an observation image including a first target image as an image of the first target reflected by the cornea and a second target image as an image of the second target reflected by the cornea; a tester including the target projecting optical system and the target photographing optical system; an alignment adjuster that adjusts at least a positional relationship between the examinee's eye and the tester in a direction of a working distance which is a distance between the examinee's eye and the tester; and a corrector that acquires an actual error from a proper working distance on the basis of association information indicating an association of position information on positions of the first and second target images on the observation image with an error in the working distance with respect to the proper working distance due to a corneal curvature radius of the examinee's eye and a non-telecentricity of the target photographing optical system and the position information on the tester at a current position thereof in the working distance direction, thereby correcting the actual error.

[Outline]

An ophthalmic apparatus according to an embodiment of the present disclosure will be described. Items below in angle brackets may be utilized independently of or in association with each other.

The ophthalmic apparatus (e.g., an ophthalmic apparatus 1) of the present embodiment tests an examinee's eye. For example, the ophthalmic apparatus includes a tester (e.g., a photographer 2). For example, the ophthalmic apparatus includes an alignment adjuster (e.g., a driver 5). For example, the ophthalmic apparatus includes a corrector (e.g., a controller 71).

<Tester>

In the present embodiment, the tester is included to photograph or measure the examinee's eye. The tester includes a target projecting optical system (e.g., an alignment target projecting optical system 50) and a target photographing optical system (e.g., an anterior segment observing optical system 200).

The target projecting optical system projects a first target and a second target on the cornea of the examinee's eye under different projection conditions. For example, the first target and the second target may be projected such that at least coordinates (a pixel position) on a later-described observation image are different between the first target and the second target.

The projection condition may include the state of a target light flux. In this case, the state of the target light flux is different between the first target and the second target. As one example, the target projecting optical system may project an infinite first target and a finite second target. In such a configuration, according to a change in a working distance which is a distance between the examinee's eye and the tester, a difference between the amount of change in the position of a target image of the first target and the amount of change in the position of a target image of the second target increases. Thus, alignment can be easily precisely performed. As another example, the target projecting optical system may project a finite first target and a finite second target. In this case, one of the finite first target or the finite second target may be projected as converging light, and the other one of the finite first target or the finite second target may be projected as diffusion light.

For example, it may only be required that the first target and the second target are different from each other in the amount of change in the position of the target image according to a change in the working distance.

For example, in a case where the projection condition is different between the first target and the second target, a positional relationship between the first target and the second target changes, in the target projecting optical system, according to at least any of the corneal curvature of the examinee's eye and the distance between the examinee's eye and the tester in a working distance direction. In the present embodiment, the later-described corrector precisely performs correction by means of the positional relationship between the first target and the second target.

The target photographing optical system is a target photographing optical system in which a configuration on an examinee's eye side is non-telecentric. In other words, the target photographing optical system is a target photographing optical system in which a configuration on an object side is non-telecentric. Note that the target photographing optical system may be, on an image side, a telecentric or non-telecentric optical system. Moreover, the target photographing optical system photographs the observation image including the first target image as a cornea reflection image of the first target and the second target image as a cornea reflection image of the second target. For example, the observation image may be an image obtained only by photographing of the first target image and the second target image. Alternatively, the observation image may be, for example, an image (e.g., an anterior segment observation image 84) obtained by photographing of the anterior segment of the examinee's eye, the first target image, and the second target image.

Note that the tester may include a testing optical system for acquiring test information on the examinee's eye. The testing optical system may be an imaging optical system for imaging the examinee's eye, or may be a measuring optical system for measuring the examinee's eye. The testing optical system may include at least any of the imaging optical system and the measuring optical system.

For example, the testing optical system may be an OCT optical system (e.g., an OCT optical system 300) that detects an interference signal of measurement light with which the fundus of the examinee's eye is irradiated and reference light. In this case, OCT data may be acquired as the test information. Moreover, in this case, an ocular axial length may be acquired as the test information. Needless to say, the testing optical system may be an optical system different from the OCT optical system. Moreover, the test information may be information different from the OCT data and the ocular axial length.

In the present embodiment, an optical path of the target photographing optical system and an optical path of the testing optical system may be formed as a common optical path by an optical path coupling member. For example, the optical path coupling member may include at least any of optical members such as a beam splitter, a dichroic mirror, and a half mirror (e.g., a half mirror 201).

<Alignment Adjuster>

In the present embodiment, the alignment adjuster adjusts at least a positional relationship between the examinee's eye and the tester in the direction of the working distance which is the distance between the examinee's eye and the tester. For example, the alignment adjuster may move the tester relative to the examinee's eye, thereby adjusting a relative positional relationship between the examinee's eye and the tester in the working distance direction. Alternatively, the alignment adjuster may move a face support (e.g., a face supporting unit 110) that supports the face of an examinee relative to the tester, thereby adjusting the relative positional relationship between the examinee's eye and the tester in the working distance direction. Needless to say, the alignment adjuster may move both of the tester and the face support, thereby adjusting the relative positional relationship between the examinee's eye and the tester in the working distance direction.

Note that the alignment adjuster may adjust a positional relationship between the examinee's eye and the tester in a right-left direction in addition to the positional relationship between the examinee's eye and the tester in the working distance direction. Alternatively, the alignment adjuster may adjust a positional relationship between the examinee's eye and the tester in an up-down direction in addition to the positional relationship between the examinee's eye and the tester in the working distance direction. Needless to say, the alignment adjuster may adjust a positional relationship between the examinee's eye and the tester in the right-left direction and the up-down direction.

<Corrector>

In the present embodiment, the corrector acquires an actual error on the basis of association information indicating an association between position information on the positions of the first and second target images on the observation image and an error in the working distance and position information acquired on each target image at a current position of the tester in the working distance direction, thereby correcting such an error. Note that the association information is set in advance, for example.

For example, the position information on each target image position may be information represented by, e.g., coordinates (a pixel position), an image height, and a ratio between an interval between first target images and an interval between second target images on the observation image. For example, the error in the working distance may be an error in the working distance with respect to a proper working distance, and may also be an error due to the corneal curvature of the examinee's eye and the telecentricity of the target photographing optical system. For example, the actual error may be an error (a difference) between the proper working distance between the examinee's eye and the tester and an actual working distance at the current position of the tester.

For example, such association information may be, in a memory, stored as a look-up table or an arithmetic formula (a function as one example) with an association between the position information and the error as described above. Using at least any of the look-up table and the arithmetic formula, the corrector may acquire and correct the actual error.

Note that the association information may be obtained using an eye model in advance in such a manner that the position information on the positions of the first and second target images and the error in the working distance are measured and associated with each other. Needless to say, the association information is not limited to above, and may be obtained in advance by simulation, for example.

In the case of using a target photographing optical system in which a configuration on an examinee's eye side is telecentric, when an infinite target is projected on the cornea of the examinee's eye, position information on the target images on an observation image changes due to a corneal curvature difference. However, the position information on the target images shows little change regardless of a change in a distance between the examinee's eye and a tester. However, in the case of using the target photographing optical system in which the configuration on the examinee's eye side is non-telecentric as in the present embodiment, the position information on the target images on the observation image changes according to the corneal curvature difference and the distance between the examinee's eye and the tester regardless of whether the target to be projected is an infinite or finite target. For this reason, the corrector performs correction in consideration of the error due to the non-telecentricity so that a test result can be accurately obtained even in the case of using the target photographing optical system in which the configuration on the examinee's eye side is non-telecentric.

The corrector may correct, on the basis of the above-described association information, the actual error in such a manner that influence of the actual error is removed from the test information acquired by the testing optical system. For example, the corrector may acquire, e.g., a measurement result taking the error between the proper working distance between the examinee's eye and the tester and the actual working distance at the current position of the tester into consideration after having adjusted the positional relationship between the examinee's eye and the tester. According to this configuration, the test result can be accurately obtained without the need for re-adjusting an alignment position. This leads to a shorter time required for re-adjusting the alignment position.

Alternatively, the corrector may drive the alignment adjuster on the basis of the above-described association information to adjust the distance between the examinee's eye and the tester to the proper working distance, thereby correcting the actual error. For example, the corrector may re-adjust, after having adjusted the positional relationship between the examinee's eye and the tester, the positional relationship between the examinee's eye and the tester such that the error between the proper working distance between the examinee's eye and the tester and the actual working distance at the current position of the tester reaches zero. According to this configuration, even in a case where the distance between the examinee's eye and the tester greatly deviates from the proper working distance, the alignment position can be corrected. Thus, the test result can be accurately obtained.

<Ocular Axial Length Acquirer>

The ophthalmic apparatus of the present embodiment may further include an ocular axial length acquirer (e.g., the controller 71). The ocular axial length acquirer acquires the ocular axial length of the examinee's eye as the test information. Note that the ocular axial length acquirer may acquire the ocular axial length by means of the OCT optical system. For example, in this case, the ocular axial length acquirer may acquire the ocular axial length on the basis of an optical path length difference which is a difference between an optical path length for the measurement light and an optical path length for the reference light, an interference signal detection result, and the position of the tester in the working distance direction.

EXAMPLE

One example of the present embodiment will be described based on the drawings.

FIG. 1 is an external view of an ophthalmic apparatus 1. As shown in FIG. 1, the ophthalmic apparatus 1 includes, in the present example, an operator 8, a monitor 73, a base 101, a moving table 102, a driver 5, a face supporting unit 110, a photographer 2, a controller 71 and the like.

The operator 8 is used to input a signal for operating the photographer 2 to the ophthalmic apparatus 1. For example, when the operator 8 is tilted, a movement signal for moving the moving table 102 relative to the base 101 at least in any of a right-left direction (an X-direction) and a front-back direction (a Z-direction) is input to the ophthalmic apparatus 1. For example, when a not-shown knob of the operator 8 is rotated, a movement signal for moving the photographer 2 relative to the base 101 in an up-down direction (a Y-direction) is input to the ophthalmic apparatus 1.

The monitor 73 displays an anterior segment image and a front image of an examinee's eye El, OCT data on the examinee's eye El and the like on a screen. Moreover, the monitor 73 functions as a touch panel also serving as the operator 8. That is, by operation of the monitor 73, the movement signal for moving the photographer 2 is also input to the ophthalmic apparatus 1.

The driver 5 moves the photographer 2 in the right-left direction, the up-down direction, and the front-rear direction. For example, the driver 5 is a slide mechanism. As one example, the slide mechanism may have a motor, a gear, a guide rail and the like.

The face supporting unit 110 supports the face of an examinee. The face supporting unit 110 has a forehead rest 111 and a chin rest 112. The forehead of the examinee contacts the forehead rest 111. The chin of the examinee is placed on the chin rest 112.

<Photographer>

The photographer 2 has an optical system (see FIG. 2) for photographing the examinee's eye E1.

In the present example, the photographer 2 includes an OCT optical system 300, an SLO optical system 500, a binocular observing optical system 600, an alignment target projecting optical system 50, and an anterior segment observing optical system 200.

In the present example, an optical path of the OCT optical system 300 and an optical path of the anterior segment observing optical system 200 are coupled to each other through a half mirror 201. That is, an optical axis (and the optical path) L1 of the OCT optical system 300 and an optical axis (and the optical path) L2 of the anterior segment observing optical system 200 are coaxial with each other through the half mirror 201.

The optical axis L1 of the OCT optical system 300 and an optical axis (and an optical path) L3 of the SLO optical system 500 are coaxial with each other through a dichroic mirror 12. An objective lens 11 is arranged on a common optical path 10 (a common optical axis) of the OCT optical system 300, the anterior segment observing optical system 200, and the SLO optical system 500.

<OCT Optical System>

The OCT optical system 300 is, for example, used for capturing a tomographic image of a tissue of the examinee's eye E1. The OCT optical system 300 includes the objective lens 11, the dichroic mirror 12, and the half mirror 201. The OCT optical system 300 may further include, for example, an OCT light source that emits low coherent light, a light splitter that splits light emitted from the light source into measurement light and reference light, a measuring optical system that guides the measurement light to the examinee's eye E1, a scanner that scans the fundus of the examinee's eye E1 with the measurement light in a transverse direction, a reference light optical system that generates the reference light, and a detector that detects an interference signal formed by combination of the measurement light and the reference light. Needless to say, the OCT optical system may include a configuration different from that described above. Note that for details of the OCT optical system 300, a configuration disclosed in, e.g., JP-A-2019-134896 may be referred.

For example, the OCT optical system 300 splits OCT light emitted from the OCT light source into the measurement light and the reference light by the light splitter. The measurement light reaches the fundus of the examinee's eye E1 through the half mirror 201, the dichroic mirror 12, and the objective lens 11. The OCT optical system 300 receives interference light of the measurement light reflected by the fundus of the examinee's eye E1 and the reference light, thereby acquiring an OCT signal of the fundus of the examinee's eye E1 and outputting such a signal to the controller 71. On the basis of the input signal, the controller 71 may generate an OCT image of the fundus Er, and may store such an image in a storage 72. The controller 71 may display the generated front image on the monitor 73.

Note that in the present example, the OCT optical system 300 may be used for measuring the ocular axial length of the examinee's eye E1. For example, in this case, the ocular axial length of the examinee's eye E1 may be acquired on the basis of an optical path length for the measurement light, an optical path length for the reference light, an interference signal detection result, and an actual working distance between the examinee's eye E1 and the photographer 2 (an actual distance between the examinee's eye E1 and the photographer 2) (details will be described later).

<SLO Optical System>

The SLO optical system 500 is used for capturing a front image of the fundus of the examinee's eye E1, for example. The SLO optical system 500 includes the objective lens 11 and the dichroic mirror 12. The SLO optical system 500 may further include, for example, a laser light source that emits laser light, a focusing lens that adjusts a focus position to the examinee's eye E1, a scanner that performs scanning with the laser light, a photo detector that receives return light reflected by the fundus of the examinee's eye E1, an apertured mirror that allows the light emitted from the laser light source to transmit therethrough or reflects the return light to guide such light to a photo detector side, and a confocal opening that blocks the return light reflected by a position other than the focus position. Needless to say, the SLO optical system 500 may have a configuration different from that described above. Note that for details of the SLO optical system 500, a configuration disclosed in, e.g., JP-A-2019-134896 may be referred.

<Binocular Observing Optical System>

Figure 2:
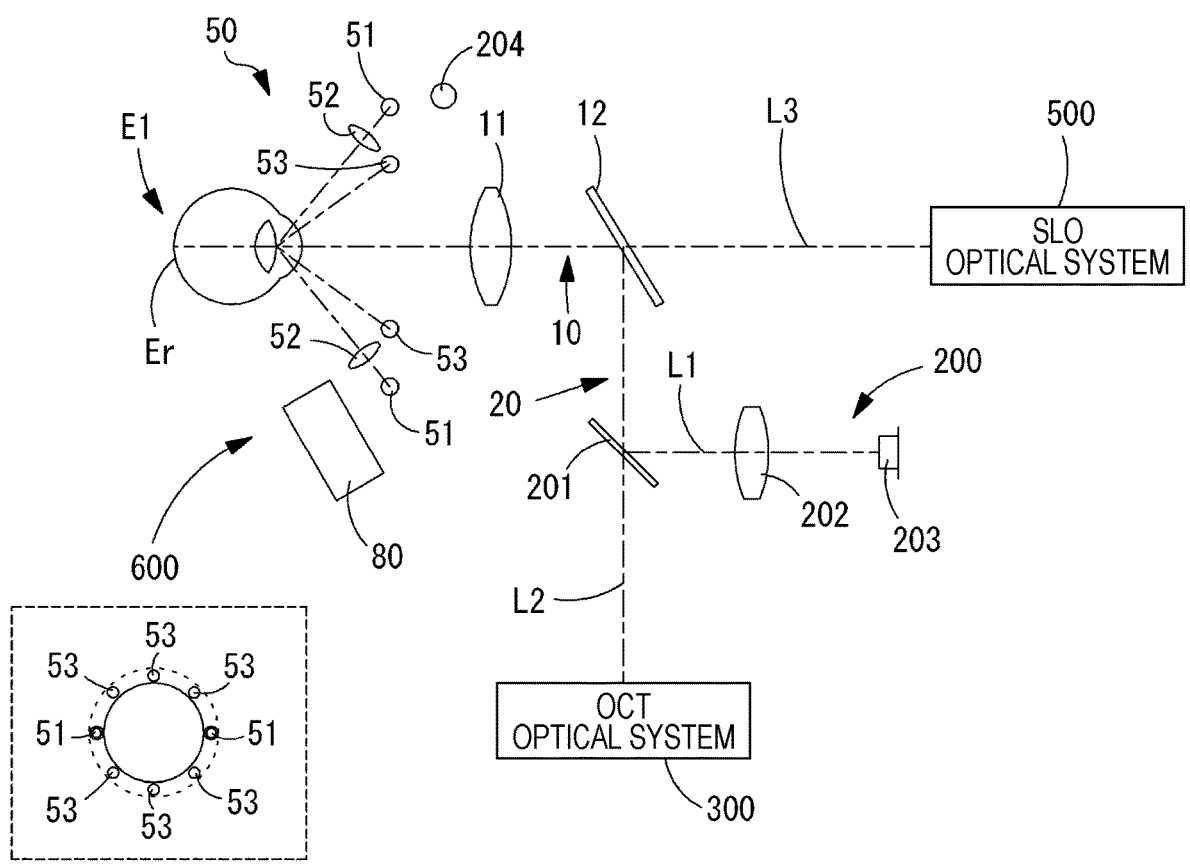
FIG. 2 is a schematic view of a photographing optical system.

The binocular observing optical system 600 is included to observe both examinee's eyes E1 upon alignment between the photographer 2 and the examinee's eye E1. In the present example, a binocular camera 80 is included as the binocular observing optical system 600. As shown in FIG. 2, the binocular camera 80 is, for example, provided on an examinee side of the photographer 2, and photographs the face of the examinee supported on the face supporting unit 110. A binocular observation image photographed by the binocular camera 80 is displayed on, e.g., the monitor 73 by the later-described controller 71. Needless to say, the binocular observing optical system 600 may include other members.

<Alignment Target Projecting Optical System>

The alignment target projecting optical system 50 projects an alignment target light flux on the examinee's eye E1. In the alignment target projecting optical system 50, multiple infrared light sources are arranged at an interval of 45° on a concentric circle about the optical axis L1, as shown in a lower left view in a dotted line in FIG. 2. The ophthalmic apparatus 1 in the present example mainly includes a first target projecting optical system (0 degrees and 180 degrees) and a second target projecting optical system.

The first target projecting optical system projects an infinite first target on the cornea of the examinee's eye E1. The first target projecting optical system has infrared light sources 51 and collimating lenses 52. The infrared light sources 51 are arranged horizontally symmetrically with respect to a vertical plane passing through the optical axis L1. The second target projecting optical system projects a finite second target on the cornea of the examinee's eye E1. The second target projecting optical system is arranged at a position different from that of the first target projecting optical system, and has six infrared light sources 53. For example, the infrared light sources 53 are arranged in the up-down direction and an oblique direction about the optical axis L1. Needless to say, in the first target projecting optical system and the second target projecting optical system, the angles of projecting the target (i.e., the positions of the infrared light sources 51 and the infrared light sources 53) are not limited to those described above. Note that for the sake of convenience, FIG. 2 shows two infrared light sources 51 and two collimating lenses 52 (0 degrees and 180 degrees) in the first target projecting optical system and some (two) of the infrared light sources 53 (45 degrees and 135 degrees) in the second target projecting optical system.

<Anterior Segment Observing Optical System>

The anterior segment observing optical system 200 is used to image the anterior segment of the examinee's eye E1 to acquire the anterior segment image.

The anterior segment observing optical system 200 includes an anterior segment illuminating light source 204. Moreover, the anterior segment observing optical system 200 mainly includes, on a reflection side of the dichroic mirror 12, the half mirror 201, a relay lens 202, and a photo detector 203. Reflected light from the anterior segment illuminated by the anterior segment illuminating light source 204 is received by the photo detector 203 through the optical system from the objective lens 11 to the relay lens 202 by way of the dichroic mirror 12 and the half mirror 201. In this manner, the anterior segment image is photographed.

Note that the anterior segment observing optical system 200 also serves as an optical system that detects an alignment target image formed on the cornea of the examinee's eye E1. That is, the anterior segment observing optical system 200 photographs, in addition to the anterior segment of the examinee's eye E1, first and second target images formed on the cornea of the examinee's eye E1, thereby acquiring the anterior segment image.

Figure 3:
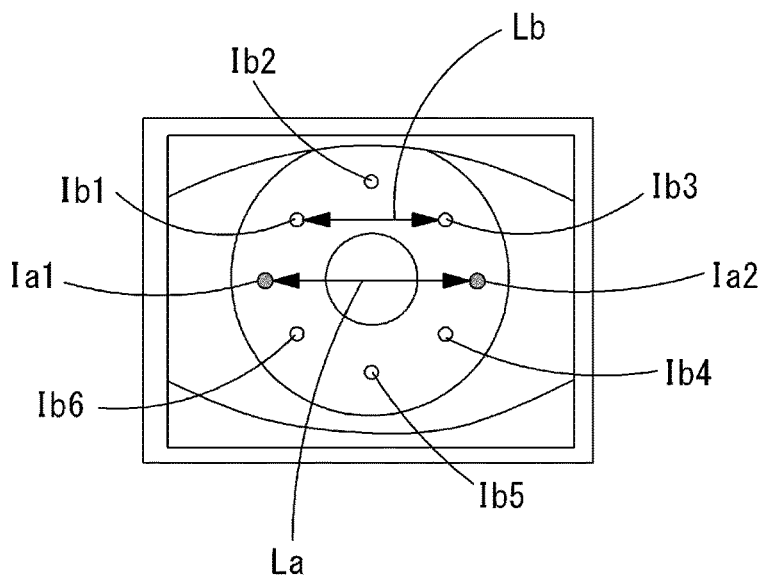
FIG. 3 shows one example of an anterior segment image photographed with alignment targets projected.

FIG. 3 is one example of the anterior segment image. First targets are projected on the cornea of the examinee's eye E1, and accordingly, first target images Ia1, Ia2 as first target images reflected by the cornea are on the anterior segment image. Moreover, second targets are projected on the cornea of the examinee's eye E1, and accordingly, second target images Ib1 to Ib6 as second target images reflected by the cornea are on the anterior segment image.

In the present example, the anterior segment observing optical system 200 is an optical system in which a side closer to the examinee's eye E1 with respect to the objective lens 11 (i.e., an object side) is non-telecentric. More specifically, in the present example, a configuration from the examinee's eye E1 to the objective lens 11 is a non-telecentric optical system. This is because part of the optical path of the anterior segment observing optical system 200 is also used as the optical path of the OCT optical system 300.

For example, in the ophthalmic apparatus 1 of the present example, the focus position of the objective lens 11 is present between the objective lens 11 and the dichroic mirror 12. In this case, a space for arranging a diaphragm at the focus position of the objective lens 11 is sometimes difficult to be ensured. Even in a case where the diaphragm can be arranged at the focus position of the objective lens 11, if scanning with the measurement light is performed upon photographing with the OCT optical system 300, the measurement light is blocked by the diaphragm and it is difficult to obtain proper OCT data in some cases. For this reason, the anterior segment observing optical system 200 is the optical system in which the configuration on the examinee's eye E1 side is non-telecentric.

Note that in the present example, the case where part of the optical path of the anterior segment observing optical system 200 is also used as the optical path of the OCT optical system 300 has been described. On this point, the present example is not limited to this case, and for example, the difficulty in diaphragm arrangement and blocking of the measurement light by the diaphragm as described above might be caused even in a case where part of the optical path of the anterior segment observing optical system 200 is also used as, e.g., an optical path of the SLO optical system 500.

<Controller>

Figure 4:
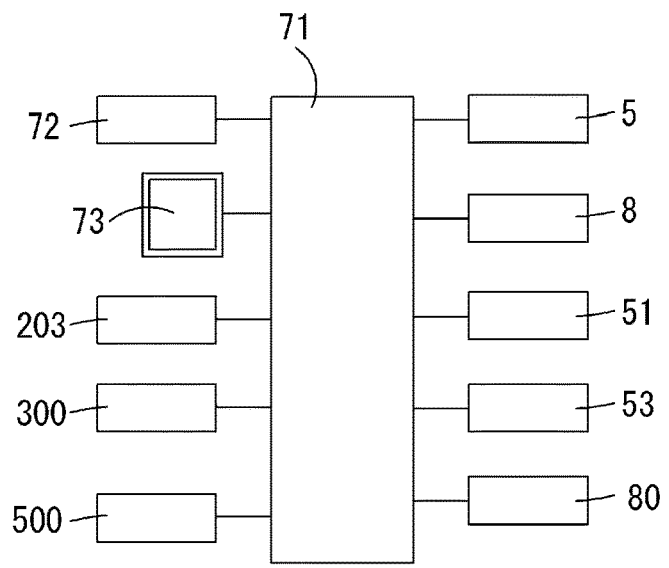
FIG. 4 is a block diagram showing a control system of the ophthalmic apparatus.

A control system of the ophthalmic apparatus 1 will be described with reference to FIG. 4. Note that FIG. 4 is a block diagram showing the control system of the ophthalmic apparatus 1. In the ophthalmic apparatus 1, the controller 71 controls each unit. The controller 71 is a processing apparatus (a processor) having an electronic circuit that performs control and calculation for each unit of the ophthalmic apparatus 1. The controller 71 includes, for example, a central processing unit (CPU). The controller 71 is electrically connected to the storage 72 via, e.g., a bus.

For example, the controller 71 is also electrically connected to each unit such as the driver 5, the operator 8, the monitor 73, the infrared light sources 51, the infrared light sources 53, the photo detector 203, the anterior segment illuminating light source 204, and the binocular camera 80. Moreover, the controller 71 is also electrically connected to each unit such as the not-shown laser light source and a not-shown imaging device included in the SLO optical system 500. Further, the controller 71 is also electrically connected to each unit such as the not-shown OCT light source and the not-shown detector included in the OCT optical system 300.

In the present example, the controller 71 controls the driver 5 to perform alignment between the photographer 2 and the examinee's eye E1 in the X- and Y-directions (see FIG. 1) and alignment between the photographer 2 and the examinee's eye E1 in a working distance direction (the Z-direction in FIG. 1).

[Operation]

Figure 8:
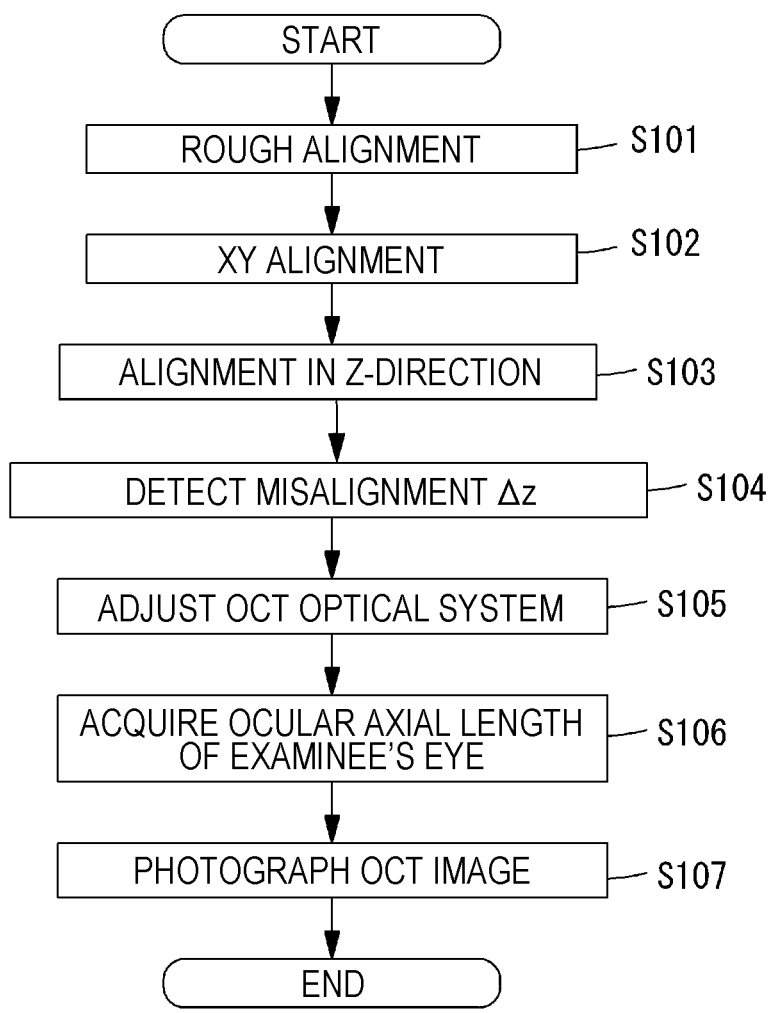
FIG. 8 is a flowchart showing operation of the ophthalmic apparatus.

Operation of the ophthalmic apparatus 1 having the above-described configuration will be described with reference to a flowchart of FIG. 8. As shown in FIG. 8, in the present example, the OCT image is photographed, and the ocular axial length is measured.

<S101: Rough Alignment>

First, the controller 71 roughly adjusts the positions of the photographer 2 and the examinee's eye E1.

When the examinee contacts the forehead thereof with the forehead rest 111 and places the chin thereof on the chin rest 112, a detection signal is output from the not-shown detector. Accordingly, the controller 71 starts photographing the face of the examinee by the binocular camera 80. An examiner instructs the examinee to gaze a fixation target of a not-shown fixation target projecting unit. Thereafter, the examiner touches the pupil center of one of the right and left examinee's eyes E1 on a binocular observation image, which is photographed by the binocular camera 80 and includes both eyes of the examinee, on the monitor 73 while viewing the binocular observation image on the monitor 73. The controller 71 drives the driver 5 on the basis of a signal from the monitor 73, thereby moving the photographer 2 such that the optical axis L1 is positioned at the touched position on the binocular observation image. For example, the controller 71 calculates a drive amount in each of the X-direction and the Y-direction on the basis of the coordinates of the touched portion on the monitor 73, and drives the driver 5 in the X- and Y-directions. Then, after completion of the operation of moving the photographer 2 in the X- and Y-directions, the controller 71 may move the photographer 2 forward until an alignment target image is detected.

When the photographer 2 approaches the examinee's eye E1, an anterior segment observation image 84 (see FIG. 3) photographed by the anterior segment observing optical system 200 is displayed on the monitor 73. Note that the anterior segment observation image 84 includes, as alignment target images, first target images Ia1, Ia2 and second target images Ib1 to Ib6.

<S102: XY Alignment>

Subsequently, the controller 71 detects each target image from the anterior segment observation image 84. Thereafter, the controller 71 starts automatic alignment control, thereby performing alignment of the photographer 2 with the examinee's eye E1 in the X- and Y-directions.

For example, the controller 71 detects, as the substantially cornea center, the XY coordinates of the center of a circle formed by the first target images Ia1, Ia2 and the second target images Ib1 to Ib6. Further, the controller 71 moves the photographer 2 such that the detected substantially cornea center and an XY alignment reference position (e.g., an intersection between an imaging surface of the photo detector 203 and the optical axis L2) set on the photo detector 203 are coincident with each other. Note that this XY alignment method is one example. For example, a method described in JP-A-2016-67795 may be referred as the XY alignment method.

<S103: Alignment in Z-Direction>

Subsequently, the controller 71 performs alignment of the photographer 2 with the examinee's eye E1 in the Z-direction (the working distance direction) based on the anterior segment observation image 84. For example, the controller 71 moves the photographer 2 such that the distance from the examinee's eye E1 to the photographer 2 (the objective lens 11) reaches a proper working distance.

Figure 5A:
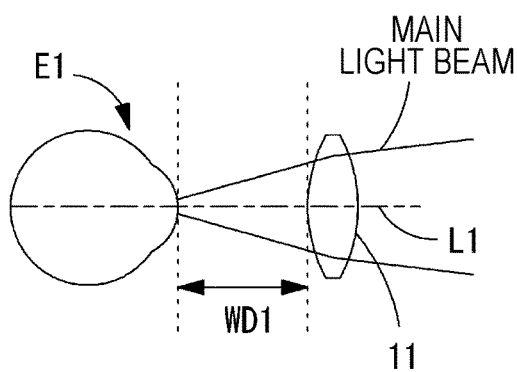
FIGS. 5A and 5B are views for describing a working distance misalignment.

For example, the controller 71 analyzes the anterior segment observation image 84 (see FIG. 3) photographed in real time by the anterior segment observing optical system 200, thereby obtaining the ratio (hereinafter referred to as a ratio Lb/La) of an interval Lb between the second target images Ib1, Ib3 to an interval La between the first target images Ia1, Ia2. Moreover, the controller 71 adjusts, for example, a positional relationship between the examinee's eye E1 and the photographer 2 such that the ratio Lb/La reaches a predetermined value P (e.g., 0.7). Note that the predetermined value P is a value of the ratio Lb/La in a case where the photographer 2 is arranged such that the working distance which is the distance between the examinee's eye E1 and the photographer 2 reaches a proper working distance WD1 (e.g., 25 mm) shown in FIG. 5A when a corneal curvature radius is a reference value (e.g., 7.8 mm), and is a preset value. Note that the predetermined value P for the ratio Lb/La is stored in the storage 72.

Figure 5B:
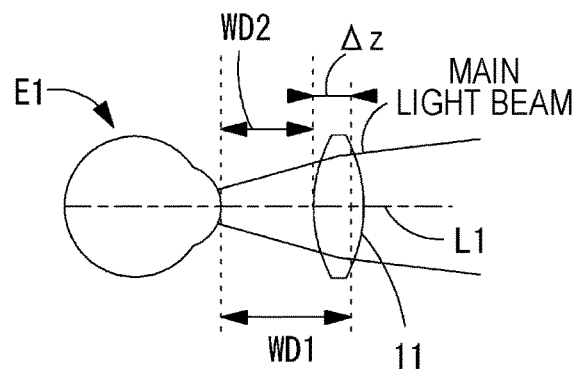

Even in a case where alignment is, as shown in FIG. 5B, performed such that the ratio Lb/La reaches the predetermined value P, there might be an error (hereinafter referred to as a misalignment $\Delta z$) due to the corneal curvature radius between an actual working distance WD2 and the proper working distance WD1. In a typical technique described as an example in JP-A-10-127581, a corneal curvature radius and an error (a misalignment) due to the corneal curvature radius are acquired using a condition where the position of a target image of an infinite target acquired via an anterior segment observing optical system having a telecentric configuration on an examinee's eye E1 side is in one-to-one correspondence with the corneal curvature radius.

However, in the present example, the anterior segment observing optical system 200 is the optical system in which the configuration on the examinee's eye E1 side is non-telecentric. Thus, the positions (the interval La in the present example) of the first target images as target images of infinite targets change according to the position of the photographer 2 in the Z-direction. Moreover, the positions of the first target images also change according to the corneal curvature radius. Thus, in the present example, the positions of the first target images as the target images of the infinite targets are subjected to the combined influence of the position of the photographer 2 in the Z-direction and the corneal curvature radius. For this reason, in the present example, it is difficult to acquire the misalignment $\Delta z$ by a technique similar to the typical technique.

On this point, in the present example, the controller 71 obtains the misalignment $\Delta z$ as described below, and performs correction.

<S104: Detection of Misalignment $\Delta z$>

For obtaining the misalignment $\Delta z$, the controller 71 uses not only position information on the first target images but also a positional relationship among the first target images and the second target images, thereby obtaining the corneal curvature radius R of the examinee's eye E1.

As one example, the controller 71 obtains the corneal curvature radius R on the basis of the height position of the first target images and the positional relationship among the first target images and the second target images. In the present example, the interval La between the first target images Ia1, Ia2 is used as the height position of the first target images (see FIG. 3). Needless to say, the height position of the first target images is not limited to above. For example, coordinates on the anterior segment observation image 84 may be used as the height position of the first target images. Note that instead of the height position of the first target images, the height position of the second target images (e.g., the interval Lb between the second target images Ib1, Ib3) may be used.

Figure 6:
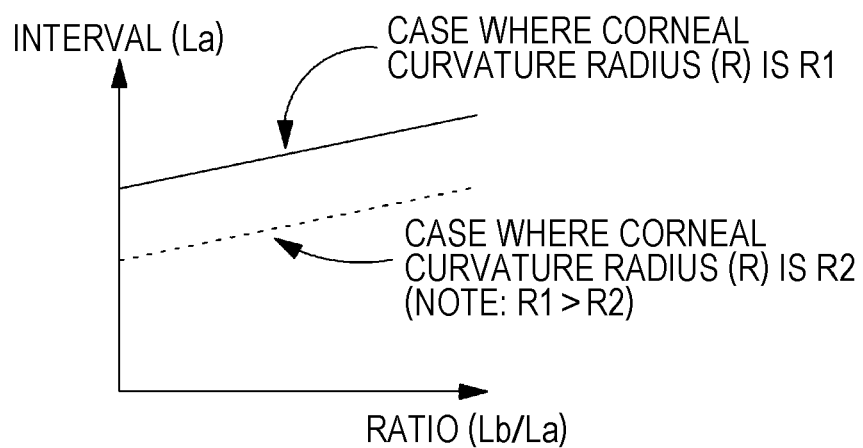
FIG. 6 shows a correspondence between an interval La between first target images and a ratio Lb/La for each corneal curvature radius.

In the present example, a correspondence Cr1 between the interval La between the first target images and the ratio Lb/La is, as a function shown in FIG. 6, stored for each corneal curvature radius R in the storage 72. For example, the correspondence Cr1 may be set in advance for multiple corneal curvature radiuses (in this example, corneal curvature radiuses R1, R2) on the basis of, e.g., experiment or simulation. Thus, the controller 71 can obtain the corneal curvature radius R with reference to the correspondence Cr1 obtained using the first target image interval La and the ratio Lb/La detected from the anterior segment observation image 84 of the examinee's eye E1. Needless to say, the function shown in FIG. 6 is one example of the correspondence Cr1, and the correspondence Cr1 is not limited to above.

Subsequently, the controller 71 uses the obtained corneal curvature radius R, thereby detecting the misalignment $\Delta z$.

Figure 7:
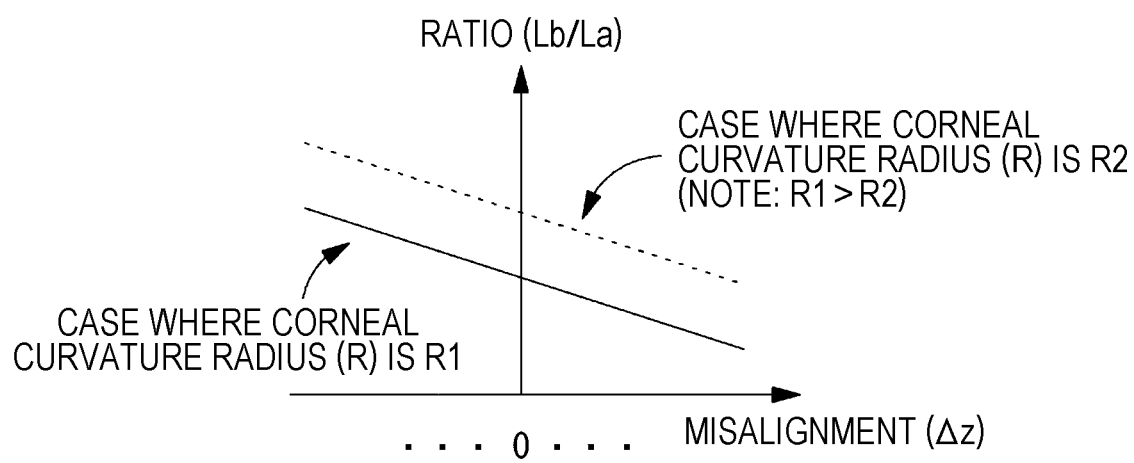
FIG. 7 shows a correspondence between the ratio Lb/La and a misalignment $\Delta z$ for each corneal curvature radius.

In the present example, a correspondence Cr2 between the ratio Lb/La and the misalignment $\Delta z$ is, as a function shown in FIG. 7, stored for each corneal curvature radius R in the storage 72. For example, the correspondence Cr2 may be set in advance for multiple corneal curvature radiuses on the basis of, e.g., experiment and/or simulation. Thus, the controller 71 acquires, as the misalignment $\Delta z$, the deviation of the actual working distance WD2 from the proper working distance WD1 with reference to the correspondence Cr2 obtained using the ratio Lb/La detected from the anterior segment observation image 84 of the examinee's eye E1 and the corneal curvature radius R obtained as described above. Needless to say, the function shown in FIG. 7 is one example of the correspondence Cr2, and the correspondence Cr2 is not limited to above.

By the above-described operation, even when the anterior segment observing optical system 200 in which the configuration on the examinee's eye E1 side is non-telecentric is used, the misalignment $\Delta z$ from the proper working distance when alignment in the Z-direction is actually performed can be properly obtained.

<S105: Adjustment of OCT Optical System>

After completion of alignment of the photographer 2 with the examinee's eye E1 in the X-, Y-, and Z-directions, the controller 71 adjusts the OCT optical system 300. At this point, the controller 71 adjusts an optical path length difference between a reference light optical system and a measuring optical system, for example.

Note that in the present example, the optical path length of the reference light optical system is an optical path length until the reference light emitted from the light splitter reaches the detector. In the present example, the optical path length of the reference light optical system is a fixed value. Moreover, in the present example, the optical path length of the measuring optical system is an optical path length until the measurement light emitted from the light splitter is reflected by the examinee's eye E1 and reaches the detector.

In the present example, the controller 71 controls a not-shown pulse motor provided in the measuring optical system while irradiating the examinee's eye E1 with the measurement light, thereby adjusting the optical path length of the measuring optical system. For example, the controller 71 adjusts the optical path length of the measuring optical system such that an interference signal of return light which is the measurement light reflected by the fundus and the reference light is detected. More specifically, adjustment is performed such that a fundus image based on the interference signal is displayed within a predetermined section from a zero delay.

<S106: Acquisition of Ocular Axial Length of Examinee's Eye>

Next, the controller 71 acquires an ocular axial length. In the present example, the controller 71 arranges an eye model (e.g., the ocular axial length thereof is AL2) with a known ocular axial length with the proper working distance WD1, and obtains the ocular axial length AL1 of the examinee's eye E1 as follows with reference to the state of the ophthalmic apparatus 1 when the eye model is photographed after the optical path length difference between the measuring optical system and the reference light optical system has been adjusted as described above. Note that the eye model may be photographed in advance upon shipping of the ophthalmic apparatus 1 from a factory. At this point, a parameter for specifying the state of the ophthalmic apparatus 1 when the eye model is photographed is stored in a memory.

First, the controller 71 obtains a difference $\Delta p$ in a correction amount of the optical path length difference between the reference light optical system and the measuring optical system. The difference $\Delta p$ is represented by the following formula.

$$\Delta p = p2 - p1 \quad (1)$$

In this formula, p1 indicates the correction amount of the optical path length difference in the processing of S105, and p2 indicates the correction amount of the optical path length difference when the eye model is photographed. The correction amount of the optical path length difference may be derived on the basis of a drive amount (a drive amount from an initial value) of the above-described pulse motor.

Figure 9:
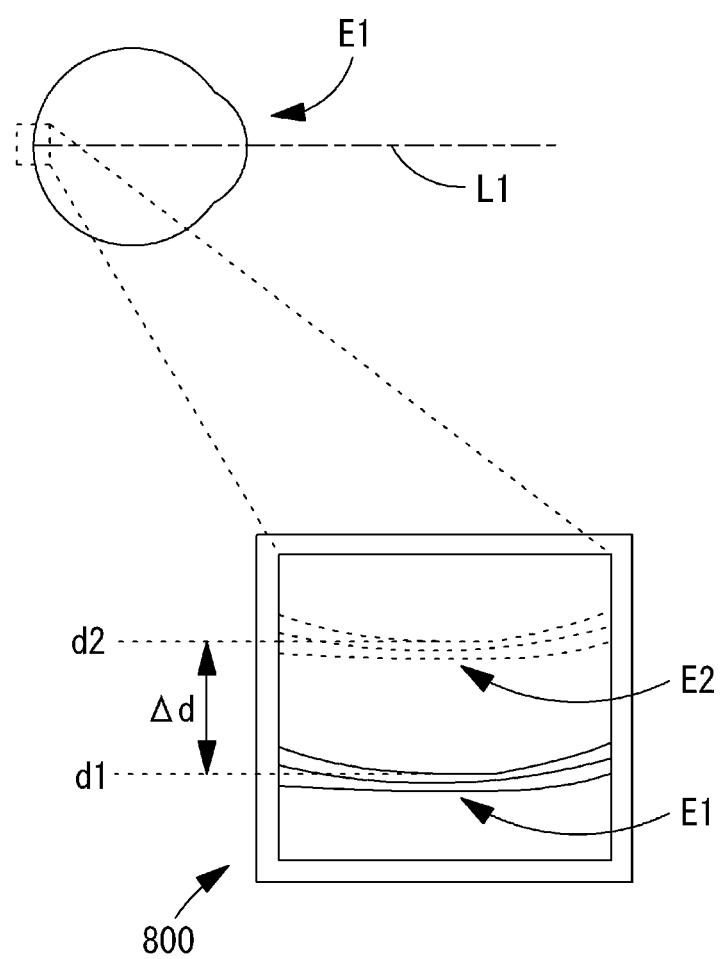
FIG. 9 is a view for describing an image displacement.

Next, the controller 71 acquires a fundus tomographic image 800 as shown in FIG. 9 in a state in which the optical path length difference has been corrected by the processing of S105. Moreover, the controller 71 acquires an image displacement $\Delta d$.

As shown in FIG. 9, the image displacement $\Delta d$ indicates a displacement amount in the Z-direction between the position d1 of a fundus image on the fundus tomographic image 800 and the position d2 of a fundus image obtained by photographing of the eye model. Note that the position d2 is a known value based on eye model photographing. The controller 71 analyzes the fundus tomographic image 800 to obtain the position d1 of the fundus image, thereby calculating a difference between the position d1 and the position d2. Accordingly, the image displacement $\Delta d$ is acquired.

If the examinee's eye E1 is arranged with the proper working distance WD1, the ocular axial length AL1 of the examinee's eye E1 is represented by the following formula by means of the ocular axial length AL2 of the eye model, the difference $\Delta p$ in the optical path length difference correction amount, and the image displacement $\Delta d$.

$$AL1 = AL2 + \Delta p + \Delta d \quad (2)$$

AL2 is known, and the difference $\Delta p$ in the optical path length difference correction amount and the image displacement $\Delta d$ are obtained as described above. Thus, the controller 71 assigns each value into Formula (2), thereby obtaining the ocular axial length AL1 of the examinee's eye E1.

However, the photographing optical system is the optical system in which the configuration on the object side is non-telecentric, as described above. Thus, the actual working distance WD2 with which the examinee's eye E1 is arranged deviates from the proper working distance WD1 by the misalignment $\Delta z$.

Thus, the ocular axial length AL2 based on (2) is corrected by the misalignment $\Delta z$. That is, the misalignment $\Delta z$ of the ocular axial length AL2 is corrected. Specifically, the ocular axial length AL3 of the examinee's eye E1 after correction can be obtained as in Formula (3) below.

$$AL3 = AL1 + \Delta z \quad (3)$$

According to this method, the misalignment $\Delta z$ from the proper working distance can be corrected even in a case where alignment is performed using the non-telecentric optical system. Thus, the ocular axial length of the examinee's eye E1 can be accurately obtained.

Note that in the present example, the following example has been described: the ocular axial length is obtained once under the assumption that the examinee's eye E1 is arranged at the position with the proper working distance WD1, and the misalignment $\Delta z$ is corrected for such a value of the ocular axial length. On this point, the misalignment $\Delta z$ may be, without obtaining the ocular axial length, corrected to obtain the ocular axial length of the examinee's eye E1, needless to say. That is, the ocular axial length AL3 after correction may be obtained according to the following formula.

$$AL3 = AL2 + \Delta p + \Delta d + \Delta z \quad (4)$$

As described above, the ophthalmic apparatus 1 of the present example includes the anterior segment observing optical system 200 in which the configuration on the examinee's eye E1 side is non-telecentric. Even the ophthalmic apparatus 1 can obtain the misalignment $\Delta z$ in the working distance direction based on the corneal curvature radius (the corneal curvature radius R) of the examinee's eye E1 and the positional relationship between the examinee's eye E1 and the photographer 2, and can accurately obtain the test result by correction of the misalignment $\Delta z$. Note that the method for obtaining the ocular axial length as described above is one example. The method for obtaining the ocular axial length according to the present example is not limited to above.

Moreover, in the ophthalmic apparatus 1 of the present example, the alignment error is corrected in such a manner that the influence of the misalignment $\Delta z$ from the proper working distance upon alignment in the Z-direction is eliminated from the measurement result. For example, the misalignment $\Delta z$ is obtained using the interval La between the first target images and the ratio Lb/La of the interval Lb between the second target images to the interval La between the first target images, and the ocular axial length measurement result is corrected using the misalignment $\Delta z$. With this configuration, the measurement result can be accurately acquired without performing re-alignment in consideration of the misalignment Δz. Moreover, an increase in a measurement time can be suppressed.

<S107: OCT Image Photographing>

In the present example, the controller 71 photographs an OCT image of the examinee's eye E1 after measurement of the ocular axial length. For example, the controller 71 photographs the OCT image of the examinee's eye E1 on the basis of a release signal input from the outside (e.g., by a user of the ophthalmic apparatus 1). In a case where the ocular axial length is acquired and the OCT image is photographed in a series of measurement, the ocular axial length value is, for correcting the influence of the misalignment Δz on the ocular axial length, calculated and corrected in the present example instead of re-moving the photographer 2 for correction. Thus, photographing can smoothly progress, and therefore, an entire measurement time can be shortened.

For the sake of convenience in description, in the present example, the example where OCT optical system adjustment (S105) is executed between misalignment acquisition (S104) and ocular axial length acquisition (S106) has been described. Note that preferably, there is no time difference between misalignment acquisition (S104) and ocular axial length acquisition (S106), considering a change in an alignment state due to eye movement. For this reason, misalignment acquisition (S104) and ocular axial length acquisition (S106) may be executed after OCT optical system adjustment (S105).

Note that the order of performing ocular axial length acquisition and OCT image photographing is not limited to that of the example described in the present example. Either ocular axial length acquisition or OCT image photographing may be performed first. Alternatively, only ocular axial length acquisition may be performed without OCT image photographing.

[Variations]

In the present example, the case where the controller 71 performs alignment (automatic alignment) in the X-, Y-, and Z-directions has been described. On this point, a subject performing alignment is not limited to the controller 71. For example, the examiner may operate the operator 8 to manually perform alignment in the X-, Y-, and Z-directions.

In the present example, the case where the controller 71 corrects the measurement result (in this example, the ocular axial length) on the basis of the misalignment Δz to eliminate the influence of the misalignment Δz has been described. However, the controller 71 may adjust alignment in the working distance direction on the basis of the misalignment Δz, thereby eliminating the influence of the misalignment Δz. For example, the controller 71 may move the photographer 2 relative to the examinee's eye E1 to cancel the obtained misalignment Δz, thereby adjusting the working distance.

According to this configuration, the distance from the examinee's eye E1 to the photographer 2 can be adjusted to the proper working distance. Thus, the test result can be accurately obtained. Note that in a case where the current working distance greatly deviates from the proper working distance due to, e.g., a difference in the corneal curvature radius R, a better measurement accuracy is, in some cases, provided by alignment adjustment than by measurement result correction. Specifically, for the case of a great misalignment Δz, such a configuration is effective.

In the present example, the controller 71 obtains the corneal curvature radius R of the examinee's eye E1 after having performed alignment of the photographer 2 with the examinee's eye E1 in the X- and Y-directions and in the working distance direction. However, the controller 71 may obtain the corneal curvature radius R after alignment in the X- and Y-directions and before alignment in the working distance direction. In this case, the controller 71 acquires the ratio Lb/La and the interval La between the first target images from the anterior segment observation image 84 at the time of completion of alignment in the X- and Y-directions, and obtains the corneal curvature radius R on the basis of the correspondence Cr1. Moreover, the controller 71 obtains, on the basis of the corneal curvature radius R, the value of Lb/La in the case of the proper working distance WD1 for the eye with the corneal curvature radius R, and moves the photographer 2 to the position with Lb/La in the working distance direction. For example, in this case, the misalignment Δz caused upon alignment can also be canceled, and the photographer 2 can be arranged with the proper working distance.

Note that the controller 71 may directly obtain the misalignment Δz without acquiring the corneal curvature radius R of the examinee's eye E1. For example, in this case, the correspondence of the ratio Lb/La and the interval La with the misalignment Δz may be stored in advance in the storage 72. For example, such a correspondence may be obtained in such a manner that the corneal curvature radius R obtained from the correspondence Cr1 and the corneal curvature radius R used for the correspondence Cr2 are associated with each other.

In the present example, the case where the misalignment Δz is obtained from the ratio Lb/La and the corneal curvature radius R has been described. On this point, the basis for obtaining the misalignment Δz is not limited to above. For example, the misalignment Δz may be obtained from the interval La between the first target images and the corneal curvature radius (a corneal shape) R. In this case, a correspondence between the interval La and the misalignment Δz for each corneal curvature radius R may be saved in the storage 72, for example. Alternatively, the misalignment Δz may be obtained from the interval Lb between the second target images and the corneal curvature radius (the corneal shape) R, for example. In this case, a correspondence between the interval Lb and the misalignment Δz for each corneal curvature radius R may be saved in the storage 72, for example.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An ophthalmic apparatus comprising:
   a target projecting optical system that projects a first target and a second target on a cornea of an examinee's eye under different projection conditions;
   a target photographing optical system that is configured such that a configuration on an examinee's eye side is non-telecentric and photographs an observation image including a first target image as an image of the first target reflected by the cornea and a second target image as an image of the second target reflected by the cornea;

a tester including the target projecting optical system and the target photographing optical system, the tester including includes a testing optical system that acquires test information on the examinee's eye;

an alignment adjuster that adjusts at least a positional relationship between the examinee's eye and the tester in a direction of a working distance which is a distance between the examinee's eye and the tester; and a corrector that acquires an actual error from a proper working distance on the basis of association information indicating an association of position information on positions of the first and second target images on the observation image with an error in the working distance with respect to the proper working distance due to a corneal curvature radius of the examinee's eye and a non-telecentricity of the target photographing optical system and the position information on the tester at a current position thereof in the working distance direction, thereby correcting the actual error, wherein the testing optical system is an OCT optical system that detects an interference signal of measurement light with which a fundus of the examinee's eye is irradiated and reference light, and the ophthalmic apparatus further comprises an ocular axial length acquirer that acquires, as the test information, an ocular axial length of the examinee's eye on the basis of an optical path length difference which is a difference between an optical path length for the measurement light and an optical path length for the reference light, an interference signal detection result, and the position of the tester in the working distance direction.

2. The ophthalmic apparatus according to claim 1, wherein the corrector eliminates influence of the actual error from the test information on the basis of the position information on the tester at the current position thereof in the working distance direction and the association information, thereby correcting the actual error.

3. The ophthalmic apparatus according to claim 1, wherein the corrector drives the alignment adjuster on the basis of the position information on the tester at the current position thereof in the working distance direction and the association information to adjust the distance between the examinee's eye and the tester to the proper working distance, thereby correcting the actual error.

4. The ophthalmic apparatus according to claim 1, wherein the target projecting optical system projects an infinite first target and a finite second target on the cornea of the examinee's eye.

5. The ophthalmic apparatus according to claim 2, wherein an optical path of the target photographing optical system and an optical path of the testing optical system are formed as a common optical path by an optical path coupling member.

* * * * *